UNITED STATES PATENT OFFICE.

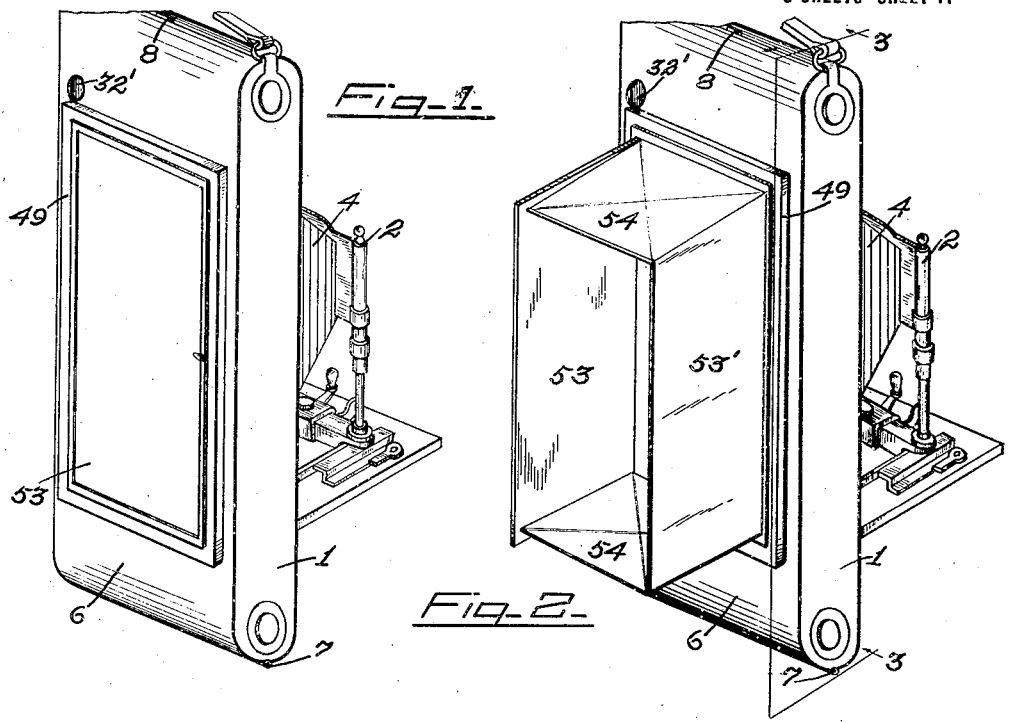

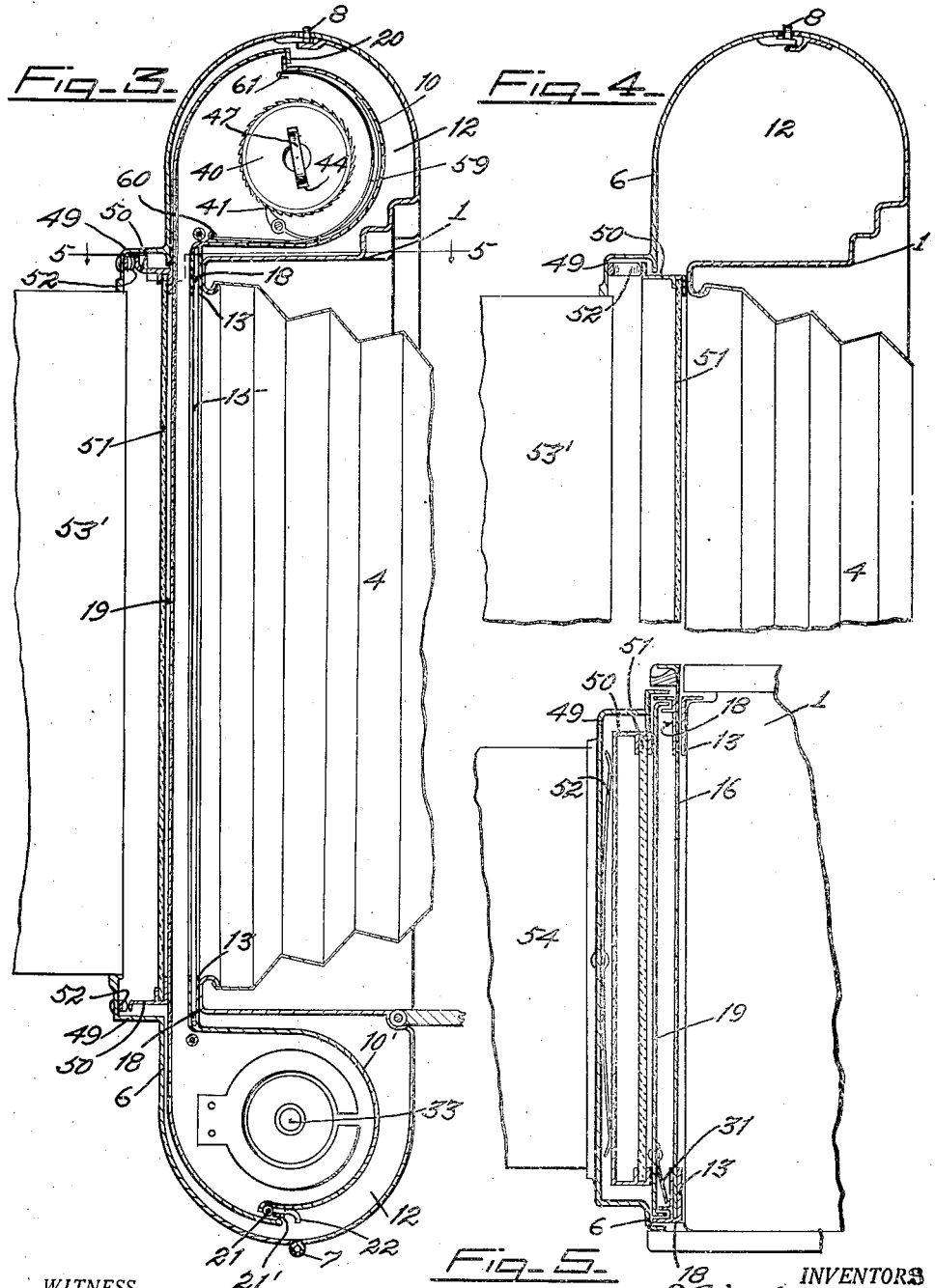

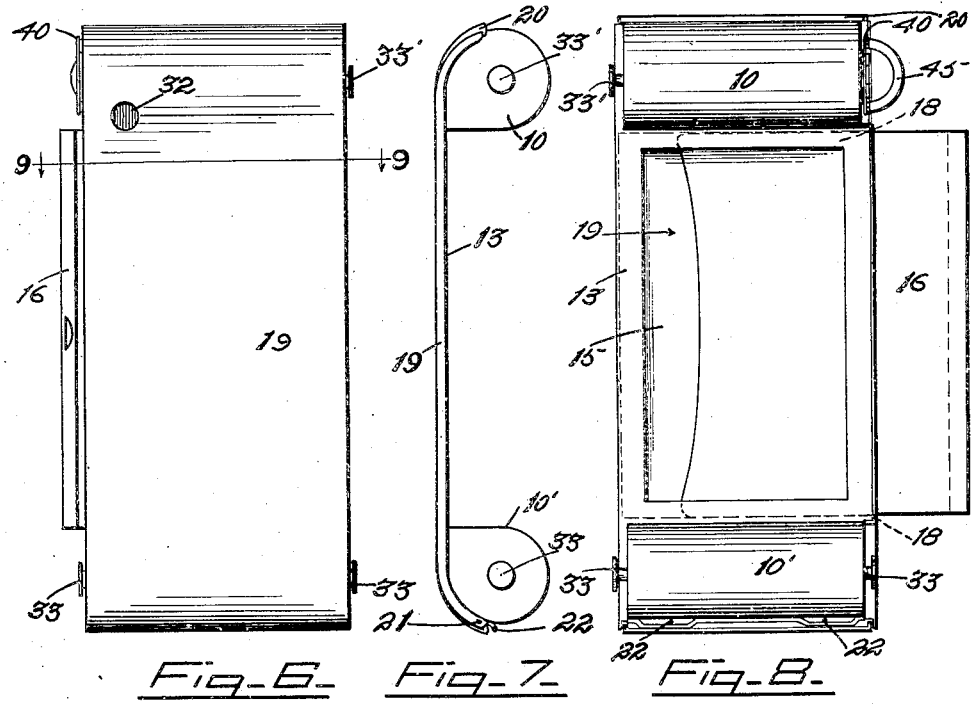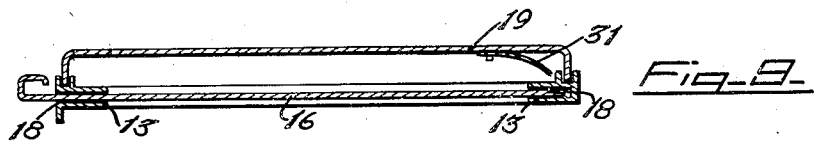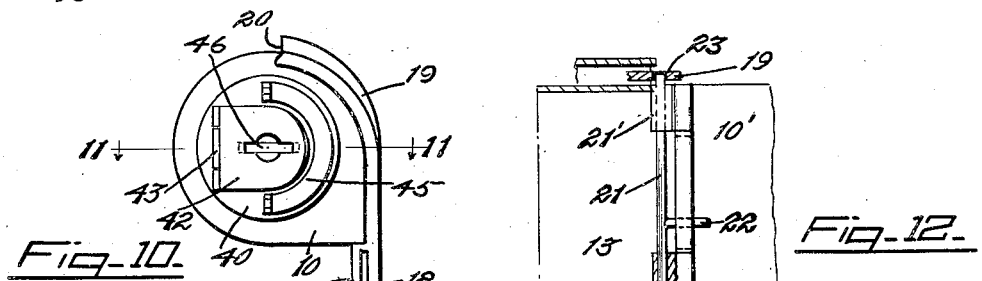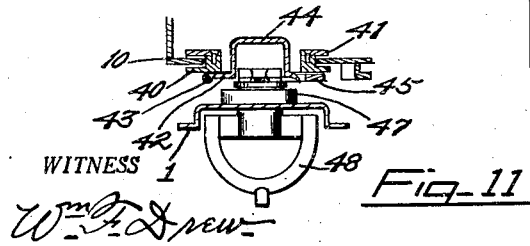

RYOTARO MIYAKE AND TOSHIO YOSHIDA, OF SAN FRANCISCO, CALIFORNIA.

CAMERA.

1,263,588.  Specification of Letters Patent.  Patented Apr. 23, 1918.

Application filed March 9, 1916. Serial No. 83,045.

*To all whom it may concern:*

Be it known that we, RYOTARO MIYAKE and TOSHIO YOSHIDA, subjects of the Emperor of Japan, residing at the city and county of San Francisco and State of California, have invented certain new and useful Improvements in Cameras, of which the following is a specification.

The present invention relates to improvements in film cameras, and more particularly to means for enabling the use of a ground glass or other similar focusing screen upon such cameras.

In cameras of the usual type, in which a flexible sensitized film, carried upon spools, is used, no provision is made for visualizing the image upon a ground glass or screen in order to properly focus said image. The camera therefore can only be focused by setting the front board carrying the lens at some indicated point or mark representing the approximate distance from the lens to the object to be photographed. This method, although satisfactory for taking "snap-shots" with small cameras, is not sufficiently accurate for large lenses, or for portrait or other close work, where the lens must be very accurately positioned with respect to the sensitized film, in order to produce a sharply defined image.

The use of sensitized glass plates in removable holders has been known to the art from the very beginning; and in such cameras the image can be thrown upon a ground glass screen when the plate holder is removed. An attempt has been made to combine this feature with the superior advantages of economy of weight and space attendant upon the use of flexible sensitized films, in the so-called film pack. The latter device, however, in addition to being more bulky than the spool carried film, is unsatisfactory for the reason that difficulty frequently arises in removing the exposed film and positioning a fresh one within the pack, without defacing or mutilating one or the other, or sometimes both.

The object of the present invention, therefore, is to provide a ground glass or other focusing screen upon a camera using a flexible sensitized film carried upon spools in the usual manner, so that such a camera may be accurately focused to produce a sharply defined image, and at the same time without interfering in any manner with the ordinary use of the camera.

In order to comprehend the invention, reference should be had to the accompanying sheets of drawings, wherein—

Figure 1 is a rear view of the camera, in perspective, showing the focusing hood closed.

Fig. 2 is a similar view showing the focusing hood open.

Fig. 3 is a longitudinal section, enlarged, through the bellows, film holder, body and back of the camera, taken in a plane represented by the line 3—3 of Fig. 2, and viewed in the direction of the arrows.

Fig. 4 is a sectional detail, taken similarly to Fig. 3, showing the position of the focusing screen with the film holder removed.

Fig. 5 is a transverse section through the body of the camera, taken in the direction of the arrows on the line 5—5 of Fig. 3.

Fig. 6 is a rear elevation of the film holder.

Fig. 7 is a side elevation of the same.

Fig. 8 is a front elevation of the same, showing the front slide partly removed and partly broken away.

Fig. 9 is a transverse section through the film holder, taken in the direction of the arrows on the line 9—9 of Fig. 6.

Fig. 10 is a detailed view, enlarged, of the key carried by the film holder for engaging and turning the spool.

Fig. 11 is a section of the same, taken in the direction of the arrows on the line 11—11 of Fig. 10, and showing in addition the key carried by the camera body.

Fig. 12 is a part-sectional detail, enlarged, of the latch for securing the back of the film holder.

In the drawings, and referring particularly to Figs. 1, 2, 3 and 4 thereof, the reference numeral 1 designates the body of a camera, which for present purposes of illustration is shown as belonging to a well known type, having an adjustable front plate 2 carrying a lens, not shown in the drawings, and an extensible bellows 4. The back 6 of the camera is preferably hinged to the body 1 at one end thereof, as shown at 7, and fastened at the other end by a suitable latch 8.

Within the body 1 immediately forward of the back 6 is a removable film holder, illustrated in Figs. 3, 6, 7 and 8 of the drawings, comprising substantially cylindrical end portions 10—10', adapted to lie within the usual end compartments 12 of the body 1, and to receive the usual type of film carrying spools. Between said spool cylinders, and uniting them together, is a front plate 13, formed with an aperture 15 to enable the film to be exposed to the light entering through the lens and the bellows 4. A slide 16 is provided to form a light-proof closure for said aperture 15, said slide working within suitable guides 18, Fig. 9 of the drawings.

A removable back plate 19, Figs. 3, 5, 6, 7 and 9 of the drawings, is spaced from the front plate 13 of the film holder, and coöperates with said front plate and the end spool cylinders 10 and 10′ to form a light-proof inclosure for the sensitized film. At its upper and lower edges, said back plate 19 is preferably formed with inwardly turned lineal flanges, as shown in Figs. 5 and 9, adapted to lie within rearwardly facing lineal grooves formed at the edges of the front plate 13, to form light-proof joints at these edges. Said back plate 19 is preferably held in place by overlapping interengaging flanges 20 at one end, and at the other end by a latch mechanism comprising a pair of transverse spring retained bolts 21, slidably mounted in guides 21′ on the side wall of the spool cylinder 10′, one of which is shown in detail in Fig. 12 of the drawings. Said bolts are provided with handles 22, and enter into sockets 23 in the side flanges of the back plate 19. Thus it will readily be seen that the back plate 19 occupies the same relation to the film holder as does the back of a film camera of the usual spool carrying type, and by the removal of said back plate 19, the film and the spools may be taken out and replaced in the holder.

To guide one edge of the film an inwardly projecting spring strip 31 is provided, as shown in Figs. 5 and 9 of the drawings. An inspection aperture 32, Fig. 6 of the drawings, preferably covered by red glass, is also provided in the back plate 19 of the film holder, and registers with a similar aperture 32′ in the camera back 6, through which the numerals and other inscriptions on the paper backing of the film may be observed.

The idler spool, that is the spool upon which is wound the unexposed portion of the film, is carried within the cylinder 10′ by means of axially disposed bearing pins 33.

The other spool, upon which is wound the exposed portion of the film, is carried within the cylinder 10, one end thereof being mounted upon a bearing pin 33′ identical with the bearing pins 33 described above. In the opposite end of said cylinder 10 is a rotatable hub 40, Figs. 10 and 11 of the drawings, which is prevented from rotating in one direction by a suitable pawl and ratchet device 41, and which carries an outwardly swinging plate 42, hinged to said hub at 43, and provided with an inwardly projecting key 44 adapted to engage the usual slot in the end of the film spool. A foldable handle 45 is also mounted upon said hub 40, by means of which said hub and the spool may be turned when the film holder is removed from the camera body. A key slot 46 is provided in the swinging member 42, which is adapted to receive a slidable and rotatable key 47, said key being preferably of the form commonly mounted in film cameras for turning the film spool. Thus when the holder is in place in the camera body, said key 47 engages the slot 46, and the hub 40 and the film spool may be turned by means of the usual exterior handle 49.

Carried by the back 6 of the camera body 1 is a box-like rearward extension 49, Figs. 1 to 5 of the drawings, within which is mounted, for fore and aft sliding movement, a frame 50, Figs. 3, 4, and 5 of the drawings, carrying a ground glass or other similar focusing screen 51. Said screen is normally held at the forward limit of its movement by springs 52 within said extension 49, which bear against said frame 50, so that when the film holder is in place within the camera the focusing screen bears against the back of said holder, and the springs 52 are compressed, as shown in Figs. 3 and 5 of the drawings, and when said film holder is removed, said screen is moved forward by said springs to lie exactly in the plane of the film, as shown in Fig. 4. Thus the image, when focused upon the screen 51, will also be focused upon the film when the same is inserted for exposure. A pair of oppositely swinging shutters 53 and 53′, Figs. 1 and 2 of the drawings, are connected by foldable end members 54, thus forming, when open, a hood through which the image upon the focusing screen 51 may be observed, and when closed, a light-proof closure over said screen.

In order to load the camera, the film holder is removed, and the film inserted therein, in a manner similar to the loading of an ordinary film camera. When said film holder is closed, it becomes a self-contained light-proof container for the film, and as such may be removed from the camera at any time without exposing said film to the light. When the holder, thus loaded, is placed in the camera, and the front slide 16 withdrawn, said camera may be used in the usual manner. When it is desired to use the focusing screen, however, the film holder is removed, and the focusing hood opened. The image now appears on the focusing screen, and may be accurately and sharply focused thereon. The film holder is then replaced in the camera, the front slide 16 removed, and the exposure made in the usual manner.

In order to assist the removal of the exposed film from the holder, there is provided within the cylinder 10, preferably approximately mid-way of its length, a flexible strip 59, Fig. 3 of the drawings, one end of which is secured at 60 to the wall of said cylinder, the other end 61 thereof being free. Said flexible strip 59 occupies a position surrounding the film spool, so that by drawing out the free end 61, said spool is lifted bodily out of its containing cylinder 10 to a position in which it may be easily grasped. It is understood, of course, that the bearing pin 33′ and the key 44 must be previously withdrawn to free the ends of the spool.

The invention has been herein described and illustrated in its preferred form. Many changes may be made in the form and construction of the device, however, without affecting the principles of the invention, and we, therefore, do not wish to be construed as limiting ourselves in this regard, but on the contrary, we wish to be understood as claiming the invention as broadly as the art will permit.

Having thus described our invention, what we claim as new and desire to protect by Letters Patent is:—

A removable film holder for cameras comprising substantially cylindrical end portions adapted to contain film carrying spools; an apertured front plate connecting said end portions; means for closing said aperture; a removable back plate associated with said end portions and said front plate to form a light-proof inclosure and an inclosed passage for guiding the film from one to the other of said spools, said front plate having rearwardly facing lineal grooves at its upper and lower edges, and said back plate having forwardly turned lineal flanges adapted to lie within said grooves to form light-proof joints; overlapping inter-engaging flanges formed upon one end of said front plate and one of said end cylinders; a transversely disposed longitudinally movable latch carried upon the opposite end cylinder and capable at its free end of reception within a socket within one of the forwardly turned lineal flanges to hold said back plate in associated relation with said front plate and said end cylinders, a spring for forcing said latch into operative position, and a latch operating handle projecting laterally from said latch and extending between the end wall of said back plate and its coöperating cylinder wall.

In testimony whereof we have signed our names to this specification in the presence of two subscribing witnesses.

RYOTARO MIYAKE.
TOSHIO YOSHIDA.

Witnesses:
HARRY A. TOTTEN,
D. B. RICHARDS.